United States Patent
Weber

[11] Patent Number: 4,664,680
[45] Date of Patent: May 12, 1987

[54] METHOD AND SYSTEM FOR ENRICHING OXYGEN CONTENT OF WATER

[75] Inventor: Willis W. Weber, Riverton, Wyo.

[73] Assignee: Atec Inc., Riverton, Wyo.

[21] Appl. No.: 849,220

[22] Filed: Apr. 7, 1986

[51] Int. Cl.$^4$ .............................................. B01F 3/04
[52] U.S. Cl. ..................................... 55/48; 55/257 R; 261/19; 261/361
[58] Field of Search .............. 261/36 R, DIG. 75, 19; 55/48, 257 R

[56] References Cited

U.S. PATENT DOCUMENTS

| | | | |
|---|---|---|---|
| 2,253,516 | 8/1941 | Haldeman | 261/36 R |
| 2,521,215 | 9/1950 | Haddeland et al. | 261/36 R |
| 3,400,818 | 9/1968 | Tarjan | 261/36 R |
| 3,470,091 | 9/1969 | Budd et al. | 261/36 R |
| 3,555,783 | 1/1971 | Grimshaw | 55/48 |
| 3,967,937 | 7/1976 | Hobbs | 55/48 |
| 4,124,660 | 11/1978 | Sterlini | 55/257 R |
| 4,207,180 | 6/1980 | Chang | 261/36 R |
| 4,290,979 | 9/1981 | Sugiura | 261/36 R |
| 4,548,712 | 10/1985 | Reid | 261/36 R |
| 4,564,480 | 1/1986 | Kamelmacher | 261/36 R |

Primary Examiner—Tim Miles
Attorney, Agent, or Firm—Dressler, Goldsmith, Shore, Sutker & Milnamow

[57] ABSTRACT

A method and a system for enriching the oxygen content of a body water having a relatively low oxygen content are disclosed. The method contemplates providing, in a pipeline communicating with the body of water, a pressurized, flowing aqueous liquid stream that is at a pressure greater than ambient and supersaturated with respective to the dissolved oxygen concentration thereof. The liquid stream is maintained substantially free of bubbles which grow in size under conditions existing in the body of water. The flow rate of the oxygen-enriched aqueous liquid stream is modulated so as to maintain a dimensionless number, defined as:

$$\frac{\rho D^3 V}{g_c \Delta P L^2 t}$$

wherein $\rho$ = density of the pressurized aqueous liquid within the pipeline,
$D$ = internal diameter of the pipeline,
$V$ = mean liquid velocity of the pressurized aqueous liquid stream within the pipeline,
$g_c$ = gravitational constant,
$\Delta P$ = pressure drop of the aqueous liquid stream flowing through the pipeline,
$L$ = length of the pipeline, and
$t$ = mean transit time required by the aqueous liquid stream to flow through the pipeline, at a value in the range of about $1 \times 10^{-10}$ to about $5 \times 10^{-7}$ until the stream is commingled with the body of water, the oxygen concentration of which is to be enriched.

9 Claims, 5 Drawing Figures

METHOD AND SYSTEM FOR ENRICHING OXYGEN CONTENT OF WATER

TECHNICAL FIELD OF THE INVENTION

The present invention is directed to a method and a system for enriching the oxygen content of a body of water having a relatively low oxygen content. In one aspect, the present invention is directed to a method and a system for enriching the oxygen content of a body of water, such as a fish hatchery raceway, pool or pond, used in aquaculture operations.

BACKGROUND OF THE INVENTION

Conventional fish hatchery management encompasses not only the conventional "hatchery", with its troughs and raceways, but also includes aquaculture systems previously considered inappropriate for rearing large numbers of fish in a captive environment. The selection of a proper dissolved oxygen concentration range for a particular aquaculture system is but one of many variables which is deemed desirable to control, for optimizing fish hatchery operations.

The maintenance of adequate dissolved oxygen levels in aquaculture systems is a complex function dependent upon the different types or species of fish which inhabit the aquaculture system. For example, it is necessary not only to consider the relative population densities of the different species of fish, and their individual sizes and general health, it is also necessary to consider the population densities of various secondary organisms such as zooplankton, phytoplankton and algae, as well. Moreover, it is known that phytoplankton, commonly found in catfish ponds, consume oxygen during periods of low solar radiation. The phytoplankton may deplete the dissolved oxygen in the pond to a point where the catfish suffer from anoxia. During such periods, it is desirable to be able to oxygenate the pond to insure survival of the catfish during this period. The ability of the aquaculture system to sustain desirable fish development is also affected by water conditions such as temperature and pH, as well as carbon dioxide, nitrogen and ammonia content of the water. For example, dissolved oxygen concentrations of aquaculture water systems are depleted of their oxygen content in a variety of ways. Major oxygen-depletion mechanisms include respiration of fish and other organisms, and chemical reaction with organic matter such as feces, and decaying plant and animal matter.

It is well known that gases such as oxygen, nitrogen and carbon dioxide are each relatively more soluble in colder water than they are in warmer water. Considering only the respiration of fish, however, metabolism increases as water temperature increases, thereby necessitating increased amounts of oxygen to sustain healthy fish growth. Also, nitrogen and/or carbon dioxide are known to displace oxygen. Excessive concentrations of nitrogen or carbon dioxide, moreover, can be harmful to fish.

Thus, because adequate amounts of dissolved oxygen are deemed critical for desirable fish growth and survival, the maintenance of predetermined dissolved oxygen concentrations is of major concern to fish culturists. In general, fish do well at dissolved oxygen concentrations above about 4 parts per million (p.p.m.). In particular, a dissolved oxygen concentration of about 5 p.p.m. oxygen is preferred, and a dissolved oxygen concentration of slightly more than about 5 p.p.m. oxygen is even more preferred.

Excessive levels of oxygen concentration, however, may induce emphysema in fish, which again is undesirable. Generally, however, oxygen-related problems in fish are caused by gas concentrations that are too low. Fish have been known to survive extended periods (i.e. days) at about 3 p.p.m., but generally do not grow well. Most fish can tolerate about 1 to about 2 p.p.m. for only a few hours, and will die if oxygen concentrations at this level are extant for a prolonged time period or drop below this level.

Recent studies have suggested that it is desirable, for the purpose of optimizing fish production, to maintain dissolved oxygen concentrations in the aquaculture system water at about the oxygen saturation level therefor at the ambient conditions thereof. (In general, the term "saturation" refers to the amount of a gas that is dissolved in a known quantity of water when the water and atmospheric phases of the dissolved gas are in equilibrium.)

In ponds that have no flowing fresh water supply, oxygen comes from only two sources, namely, diffusion from the air, and photosynthesis. Oxygen diffuses across the water surface into or out of the pond, depending on whether the water is subsaturated or supersaturated with respect to the gas. Once oxygen from the air enters the surface film of the water, it diffuses relatively slowly through the bulk of the water mass. Generally, only if surface water is mechanically mixed with the rest of the pond—by, for example, wind, pumps, aeration devices, or outboard motors—will diffused oxygen be significant in aerating the entire body of water.

Unfortunately, the oxygen-transfer or oxygen-diffusion efficiency of conventional aeration devices—such as diffused air aerators or mechanical surface aerators—is low, due principally to the relatively shallow depth of most aquaculture systems.

The requirement of maintaining the substantially saturated dissolved-oxygen concentrations at ambient conditions presents an additional impediment in aquaculture systems because in many such systems the phytoplankton, which are the major producers of oxygen when light induces photosynthesis, typically become the major consumers of oxygen in the absence of photosynthesis.

Especially during the fish growing season, the dissolved oxygen concentration in any aquaculture system is determined primarily by the balance of photosynthesis and respiration. For fish culture to flourish, dissolved oxygen concentration ranges of an aquaculture system must be controlled within predetermined limits that are dependent upon the particular type of fish culture being reared. For example, the lowest safe level for trout is about 5 p.p.m. dissolved oxygen. Other fish species, as mentioned above, may be able to tolerate a somewhat lesser dissolved oxygen concentration. However, the object is not to establish an oxygen concentration that fish can tolerate. It is desirable to be able to maintain the dissolved oxygen concentration at a fish-flourishing level that is optimal for the particular fish species that is being cultivated.

SUMMARY OF THE INVENTION

The present invention provides a method and a system for controllably enriching the dissolved oxygen content of a body of water having a relatively low oxygen content. The method contemplates providing, in a confined flow passageway (such as a pipeline) communicating with the body of water, a confined flowing aqueous liquid stream which is at a pressure above ambient and supersaturated with respect to the dissolved oxygen concentration thereof. This liquid stream is maintained substantially free of bubbles which grow in size under conditions existing in the body of water. The flow rate of the oxygen-enriched aqueous liquid stream is modulated so as to maintain a dimensionless number, defined as:

$$\frac{\rho D^3 V}{g_c \Delta P L^2 t}$$

wherein
$\rho$ = liquid density of the aqueous liquid stream under pressure in the confined flow passageway,
D = equivalent circular-pipe internal diameter of the confined flow passageway,
V = mean liquid velocity of the aqueous liquid stream in the confined flow passageway,
$g_c$ = gravitational constant, e.g., 32.174$lb_m$·ft/$lb_f$·sec$^2$,
$\Delta$P = pressure drop of the aqueous liquid stream flowing through the confined flow passageway,
L = length of the confined flow passageway, and
t = mean transit time required by the aqueous liquid stream to flow through the confined flow passageway,
at a value in the range of about $1 \times 10^{-10}$ to about $5 \times 10^{-7}$ until the stream is commingled with the body of water, the oxygen content of which is to be enriched. The pressurized, flowing, oxygen-enriched aqueous liquid stream is commingled with the body of water in a manner so as to effect oxygen enrichment of the body of water without substantial loss of oxygen from the oxygen-enriched body of water to the ambient atmosphere. Preferably, the dimensionless number value is maintained in the range of about $5 \times 10^{-10}$ to about $1 \times 10^{-8}$.

The commingling step preferably is performed in a manner such that the flux density of the aqueous stream flowing out of the distal end of the confined flow passageway and into the body of water distributes the supersaturated aqueous stream within the bulk of the body of water at a subsurface location.

Other features, aspects and/or advantages of the method of the present invention, including the system employed to achieve the method, are discussed below.

DETAILED DESCRIPTION OF PREFERRED EMBODIMENT

Figure 1:
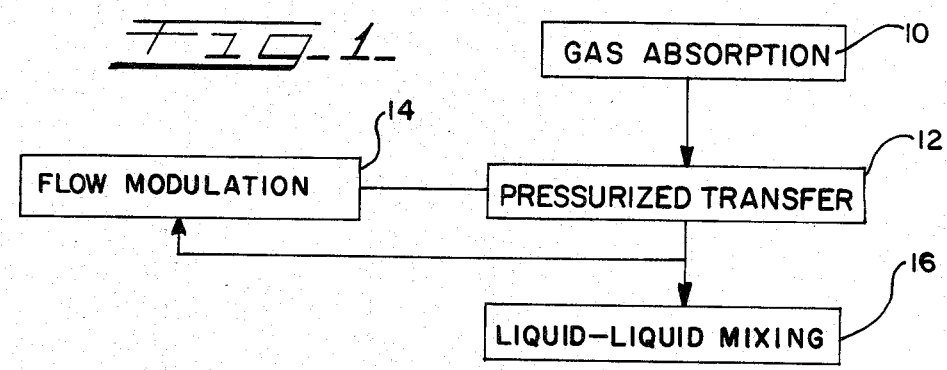
FIG. 1 is a block diagram embodying the principles of the present invention.

While the present invention is susceptible to embodiment in various forms, there is shown in the drawings and hereinafter described in detail a presently preferred embodiment of the invention, with the understanding that the instant disclosure is to be considered as an exemplification of the invention without limitation to the specific embodiment illustrated.

In a broad sense, the present invention is directed to a method for enriching the dissolved oxygen content of a body of water having a relatively low oxygen content. Although the test data presented below have been derived with a view toward enriching dissolved oxygen content so as to optimize fish growth, the present invention is applicable to a number of other situations requiring dissolved oxygen enrichment, as well.

For example, the method of the present invention is also useful for hyperbaric sterilization. In particular, well-known pathogenic-organism populations such as *Staphylococcus aureus, Pseudomonas aeruginosa,* and the like can be reduced in number substantially upon being subjected to an oxygen partial pressure in excess of about two atmospheres (i.e. about 1520 millimeters of mercury) pressure. It is therefore possible to up-grade aquaculture water, for example, by subjecting the aquaculture system water to the method of the present invention, to thereby substantially reduce the population of a preselected pathogenic organism that may be present in the aquaculture system.

Yet another application of the present invention is for oxidative leaching of mineral ores. In particular, the method of the present invention can be applied to in situ or so-called "heap leaching" of low-grade copper ore. For example, one commercial variety of copper ore consists primarily of copper sulfide, but includes iron sulfides and related compounds as well, all water insoluble. The method of the present invention can be employed to oxidize these otherwise water-insoluble compounds, with or without the aid of acidophilic bacteria such as *Thiobacillus ferrooxidans* or the like, thereby forming water soluble copper sulfates and iron sulfates. In a similar manner, effective coal desulfurization can be carried out as well. For example, particulate bituminous coal having a sulfur content of about 2 to about 8 percent and T. ferrooxidans microorganisms are slurried with oxygen-enriched water to provide a 10 to 25 weight-% of coal/water slurry. As the resulting slurry is conveyed along a slurry pipeline under turbulent flow conditions, pyritic sulfur removal from the coal can be effected.

As another example, an oxygen-supersaturated aqueous liquid stream can be injected into a natural or artificially fractured subterranean body of ore via a suitable injection system, to obtain pregnant ore liquors. The pregnant liquors, in turn, can be brought to the surface via collection wells, and thereafter purified to recover the desired metal. Conventional purification and/or recovery processes or systems include electrolysis, precipitation, and membrane-diffusion processes or systems. The resultant stripped liquors can be re-oxygenated and returned to the ore body.

In another such application, a heap of ore can be mixed and stacked over an impermeable membrane having a suitable tiled or piped drainage system disposed thereabove. The ore heap can be positioned above the membrane in a manner whereby the drainage system is arranged near the bottom of the ore heap. Oxygen-supersaturated water can be distributed over the surface of the ore via a manifolded distribution system. The drainage system thereafter can be used to collect the pregnant liquors. A pool of water can be maintained atop the ore heap, if desired, so that oxygen-supersaturated water can be distributed over the pile with minimal loss of oxygen. In this manner, the entire heap or leach pile can be rendered substantially saturated with oxygenated water, whereby oxidation of the metalic compounds proceeds without requiring permeation into the heap, as is conventionally required. One advantage of employing the present invention in such an application is that particle size of the ore, conventionally controlled to provide adequate permeability for obtaining predetermined air flow through the heap, need no longer be controlled.

In an alternative embodiment of this application, the oxygenated water can be fed into the heap via a manifolded distribution system located at the bottom of the heap. The heap can be enclosed by a suitable retaining wall and oxygenated water can be caused to flow upwardly through the heap. Such a retaining wall can be dimensioned so as to be higher than the heap, and can be constructed in a water-tight manner to enable the heap to become flooded by the oxygenated water that is introduced into the heap via the oxygenated-water distribution system. Such water, after the heap has been flooded thusly, can then be collected by a piped collector system located e.g. above the flooded heap. Such an arrangement can then be monitored to ensure that the heap is kept flooded with oxygenated water, as desired.

Still another application of the present invention contemplates removal of certain salts from water, e.g., the removal of iron and manganese from potable water. The presence of iron and manganese ions in potable water may be undesirable for a variety of reasons. For example, iron and manganese ions may impart a bitter, metalic taste to potable water, above certain concentration levels. Because iron and manganese are typically present in potable water in the form of soluble ferrous and manganous ions, respectively, such ions can be reduced in concentration, by oxidation to ferric and manganic ions which generally form insoluble compounds.

Referring now to FIG. 1, there is shown a block diagram illustrating the basic steps of the method of the present invention. A gas absorption step 10 combines a gaseous stream containing oxygen with an aqueous liquid stream to enrich the dissolved oxygen content of the aqueous liquid stream. A pressurized transfer step 12 then transfers the oxygen-enriched aqueous liquid stream to a body of water by a liquid-liquid mixing step 16 while the flow of the oxygen-enriched aqueous liquid stream is concurrently modulated by a flow-modulation step 14.

Gas absorption is a known unit operation in which soluble components of a gas, such as oxygen, are dissolved in a liquid. It is generally preferable to perform the oxygen absorption step on a continuous basis. A number of conventional apparatus types can be used for continuously contacting liquid and oxygen-containing gas streams to thereby effect oxygen absorption. These include gas-contacting devices such as packed towers, plate-type units, spray chambers, wetted-wall columns, stirred or sparged vessels, and the like.

Typically, a gas-liquid contacting apparatus is designed so that the gas and liquid streams flow countercurrently past each other therethrough. A preferred gas-absorption apparatus is a gas contactor particularly adapted to dissolve gaseous oxygen in aqueous liquid streams, and of a generally "closed" and vented design, relative to ambient conditions, so that the gaseous oxygen within the contactor can be pressurized to superatmospheric pressures that facilitate the gaseous oxygen dissolution in the aqueous liquid.

As a practical matter, aquaculture systems are known to include a variety of undesirable dissolved gases such as nitrogen, carbon dioxide, hydrogen sulfide, and hydrogen cyanide, to name a few. Water supersaturated with nitrogen can cause nitrogen bubbles to become lodged in fish blood vessels, thereby restricting respiratory circulation and even leading to death of fish by asphyxiation. Certain carbon dioxide levels may be harmful to fish. For example, 50% mortality of chum salmon eggs can occur when carbon dioxide concentrations reach 90 p.p.m. Hydrogen sulfide and hydrogen cyanide in very low concentrations can kill fish. For example, a few parts per billion (p.p.b.) of hydrogen sulfide are known to be lethal to a number of species and/or varieties of fish. Yet aquaculture systems primarily receive hydrogen sulfide as a by-product of anaerobic decomposition of sulfur compounds in sediments. Hydrogen cyanide, on the other hand, is an aquaculture contaminant contributed by industry. Hydrogen cyanide is generally toxic at concentrations of 100 p.p.b., or less.

It has been observed, employing the principles of the present invention, that enriching the dissolved oxygen content of an oxygen-subsaturated aquaculture system tends to reduce the concentration of the above-mentioned undesirable, gases dissolved therein. That is, enriching the dissolved oxygen content of the aquaculture system tends to strip these undesirable gases from the aquaculture system.

The pressurized transfer step 12 (FIG. 1) is then employed to transfer the thus-produced, oxygen-enriched liquid aqueous stream, under superatmospheric pressure, to a body of water having a relatively lower oxygen content, such as an oxygen-subsaturated aquaculture system, mentioned above. This step 12 includes containment of the oxygen-enriched aqueous liquid stream to thereby ensure that dissolved oxygen does not leave the oxygen-enriched aqueous liquid stream prematurely, i.e. before it is incorporated within the bulk of the body of water to be enriched in oxygen content. Preferably, mass transfer of the oxygen-enriched aqueous liquid stream is therefore effected in a pressurizeable confined flow passageway such as a pressurized pipeline.

As mentioned above, the present invention provides means for modulating the flow rate of an oxygen-enriched, confined aqueous liquid stream so as to maintain the oxygen concentration of a body of water within a predetermined optimal range. In particular, it has been found that a variety of physical parameters attendant to the pressurized transfer step 12 affect the level to which the body of water can ultimately be oxygenated. Accordingly, the flow modulation step 14 is used to control the flow of the oxygen-enriched, pressurized, aqueous liquid stream through the confined flow passageway for optimized ultimate oxygen transfer to the body of water that is to be oxygenated.

Then, the liquid-liquid mixing step 16 is employed, during which step the oxygen-enriched aqueous stream is combined with the body of water to be enriched with oxygen, without a substantial loss of oxygen from the body of water to the ambient atmosphere.

Figure 2:
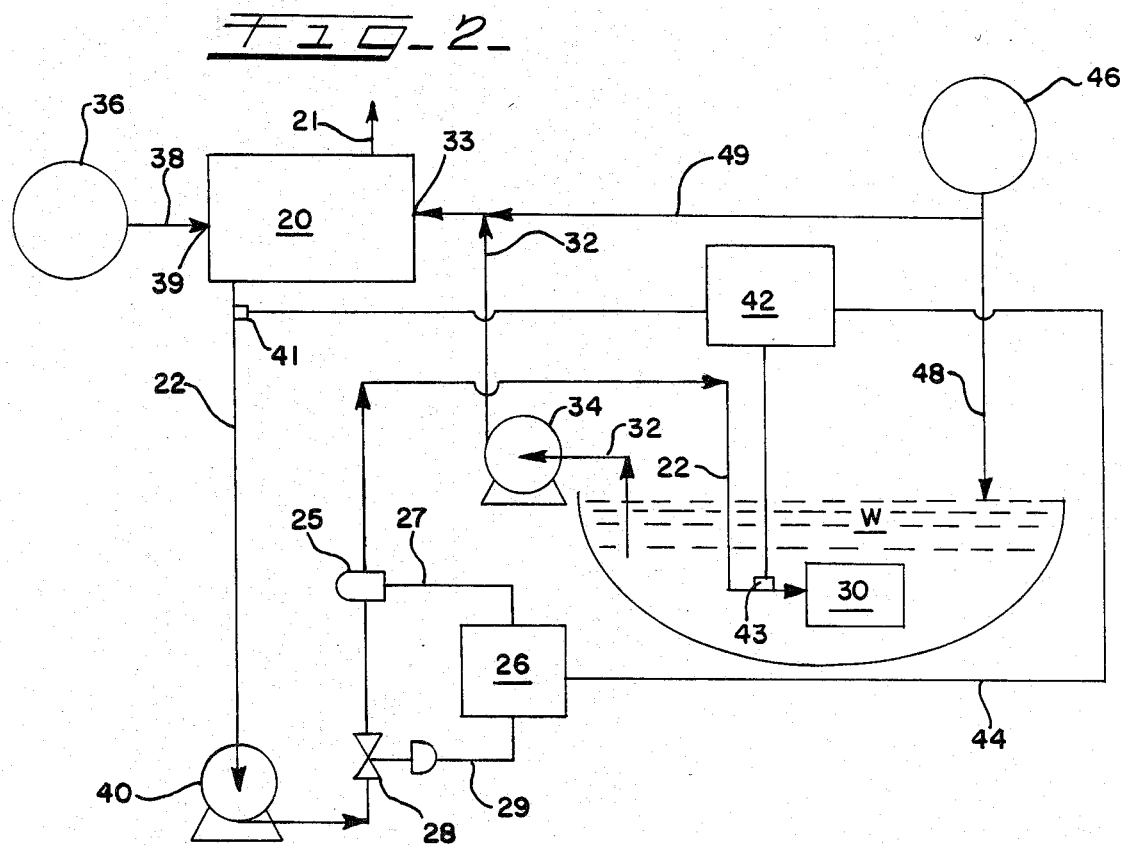
FIG. 2 is a schematic drawing illustrating a presently preferred system of the present invention.

Reference is next invited to FIG. 2 which is a schematic drawing showing the basic components of a system embodying the principles of the present invention.

Briefly, a flowing, oxygen-subsaturated aqueous liquid stream and a flowing, oxygen-containing gas are introduced into a generally closed, vented contactor device 20 where the oxygen-subsaturated liquid and oxygen-containing gas directly contact each other in a generally countercurrent-flow relationship. Contactor device 20 is pressurized to a superatmospheric pressure. The dissolved oxygen content of the aqueous liquid in the contactor device 20 is increased as a result and an oxygen-enriched aqueous liquid stream is produced. Contactor device 20 preferably includes a gas vent means 21, to enable gas which has been depleted of its oxygen content to be vented from the system.

Figure 5:
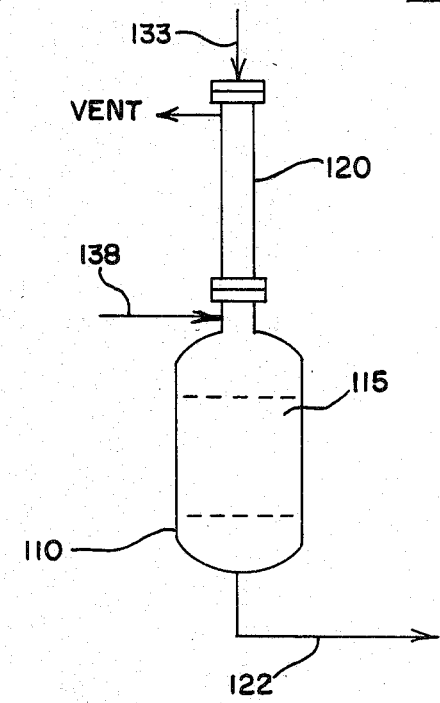
FIG. 5 is a schematic drawing of a preferred oxygenation component of the system shown in FIG. 2.

The contactor device 20 can comprise a packed column-surge tank combination of the type shown in FIG. 5 where a packed column 120 is mounted atop a surge tank 110. Water to be oxygenated is fed to packed column 120 via a line 133. Oxygenated water, in turn, is collected in surge tank 110 which also defines a gas bubble disengagement zone 115 defined by interrupted lines in FIG. 5. Surge tank 110 is sized so that liquid velocity in the downwardly direction within the surge tank 110 does not exceed about 10 cm./sec. (about 4 in./sec.) so as to permit growing gas bubbles present within the oxygenated water to disengage therefrom before the water exits from surge tank 110 via a line 122. Oxygen or oxygen-enriched air is introduced into packed column 120 via a gas line 138. Suitable packing for column 120 includes Raschig rings, Berl saddles, Intalox saddles, Tellerette rings, Pall rings, and the like.

Alternatively, contactor device 20 may comprise a tray column, a stirred reactor, or a bubble column. For example, oxygenated water can be introduced into a pressurized stirred reactor to oxidize manganese and ferrous ions, for producing insoluble compounds, in connection with a potable water-treatment system.

As shown in FIG. 2, the oxygen-enriched aqueous liquid stream is conveyed via a confined flow passageway, such as a pressurized pipeline 22, from contactor device 20 and into the bulk of a body of water W having a relatively lesser dissolved oxygen content (e.g., subsaturated relative to dissolved oxygen) to enrich the dissolved oxygen content thereof. In particular, a pressurized oxygen-containing gas from a source 36 is introduced into contactor device 20 to enrich the oxygen content of oxygen-subsaturated water flowing therethrough.

The pressurized, oxygen-containing gas supplied to contactor device 20 may be relatively pure oxygen or oxygen-enriched air. The latter can be derived from a pressure swing adsorption (PSA) system.

Because contactor device 20 includes vent means 21, a portion of the oxygen contained by such gas can be transferred into the water W to increase the dissolved oxygen concentration thereof while the gas, now reduced in or depleted of its oxygen content, can be vented from the system. This enables the water, initially subsaturated with respect to oxygen, to become supersaturated with respect to oxygen at the same time that other dissolved gases, such as nitrogen, carbon dioxide, hydrogen sulfide and hydrogen cyanide, are stripped therefrom.

The main body of water W may be a flowing water system such as a raceway or it may be an essentially quiescent water system such as a pond.

The oxygen-enriched stream conveyed via pressurized pipeline 22 can be a single-phase liquid or a two-phase fluid characterized by an aqueous continuous phase and a gaseous discontinuous phase. From the two-phase fluid, an aqueous stream which is enriched with respect to dissolved oxygen, and which is substantially free of growing gas bubbles, can be recovered while the two-phase fluid is maintained under an oxygen partial pressure greater than ambient oxygen partial pressure. The recovered aqueous stream can then be supplied to the body of water W via pipeline 22.

To optimize oxygen enrichment of the body of water W and to minimize gas bubble growth, it has been found necessary to modulate the flow of the pressurized, oxygen-enriched liquid stream flowing through pressurized pipeline 22. Accordingly, an aqueous liquid stream analyzer 26 (e.g., an oxygen electrode system) is employed to determine preselected stream parameters (i.e. oxygen concentration), by means of a suitable transducer 25 which transmits this stream information to the stream analyzer 26 by means of a communication connection or link 27. An automatic flow-control valve 28, operatively communicating with stream analyzer 26 via a separate communication link 29, can be used to adjust flow of the pressurized, oxygen-enriched liquid stream flowing through pipeline 22.

Thereafter, the oxygen-enriched aqueous liquid stream is introduced into the body of water W in a manner so as to commingle the oxygen-enriched aqueous liquid stream with the bulk of the body of water W, to enrich the dissolved oxygen content thereof without substantial loss of dissolved oxygen from the body of water W to the ambient atmosphere. To this end, a commingler 30, located at the distal end of pressurized pipeline 22, in relation to contactor device 20, can be used. Commingler 30 combines the pressurized, oxygen-enriched aqueous liquid stream with a portion of the body of water W and releases the resultant mixture into the bulk of the body of water. That is, commingler 30 is preferably submerged within the body of water W.

The aqueous liquid stream that is oxygenated can be a portion of the body of water W that is withdrawn and conveyed therefrom to contactor device 20 via a pipeline 32 and that is preferably pumped into contactor device 20 by a pump means 34. Pipeline 32 can include an inlet means 33 for introducing the oxygen-subsaturated aqueous liquid stream into contactor device 20. Alternatively, the aqueous liquid stream to be oxygenated can be obtained from a different source, e.g. a well.

As shown in FIG. 2, oxygen-containing gas source 36, briefly mentioned above, supplies the pressurized, oxygen-containing gas to contactor device 20 via a pipeline 38. Pipeline 38 can similarly include an inlet means 39 for introducing the oxygen-containing gas from source 36 into contactor device 20. A second pump means 40 can be, and preferably is, employed to transfer the oxygen-enriched aqueous liquid stream from contactor device 20 to commingler 30 via pipeline 22.

An oxygen probe can be provided in the body of water to monitor the oxygen concentration thereof. The output of the oxygen probe can be used to modulate the flow of water to the contactor device 20.

Further, pressure drop and mean transit time across a selected, predetermined segment of pressurized pipeline 22 can be monitored by a microprocessor device 42 operably associated with a respective pair of transducers or sensors 41 and 43. Transducer or sensor 41 and transducer or sensor 43 can each include a suitable liquid-density and liquid-velocity sensing element for respectively monitoring these stream parameters of the water flowing through pipeline 22, if desired. Fluid pressure drop, mean transit time data and other stream parameters such as liquid density and liquid velocity can be fed to stream analyzer 26 via a communication link 44 to further modulate operation of flow control valve 28 via analyzer 26, if desired.

The body of water W also can be supplied with make-up water, from a source 46 via a conduit 48, if desired. It may additionally be desirable, from time to time, to purge a portion of the water body W. The illustrated system (FIG. 2) can include conventional purge means (not shown) to do so, if desired. Preferably, the make-up water from source 46 is first passed through the contactor device 20 via conduit 49.

Figure 3:
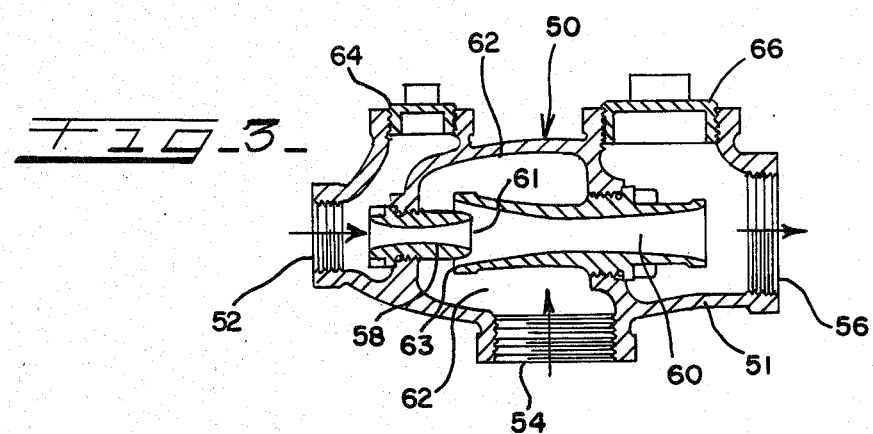
FIG. 3 is a cross sectional view of a component that can be used in the system shown in FIG. 2.

Reference is next invited to FIG. 3, where one suitable type of commingler, a liquid-liquid ejector 50, is illustrated. The liquid-liquid ejector 50 includes a motive-fluid inlet port 52 and a suction inlet port 54, respectively, and an outlet port 56. A two-stage venturi system comprising a primary venturi 58 and a secondary venturi 60 are disposed within the body 51 of ejector 50 in a manner such that the primary venturi 58 is aligned with and partially disposed within the secondary venturi 60. The pressurized, oxygen-enriched aqueous liquid stream (discussed above) is pumped, via motive-fluid inlet port 52, through both venturis 58 and 60, and is discharged from ejector 50 via outlet port 56. A chamber 62, defined within the body 51 of ejector 50, communicates with the body of water W (FIG. 2) via suction inlet port 54. Additionally, chamber 62 surrounds those portions of the venturis 58 and 60 where the discharge end 61 of the primary venturi 58 is disposed into the inlet end 63 of the secondary venturi 60.

In operation, as the pressurized, oxygen-enriched aqueous liquid stream is pumped through the liquid-liquid ejector 50, in the manner described above, a suction effect or vacuum is created in chamber 62, drawing water (from body W) into chamber 62 via suction inlet port 54, and further, into the secondary venturi 60 where mixing with the pressurized, oxygen-enriched aqueous liquid stream takes place. The resultant mixture is discharged into the body of water W via outlet port 56.

To facilitate clean-out, ejector 50 can include removable clean-out plugs 64 and 66, threadedly carried by the body 51 of ejector 50.

Because the pressure of the resultant mixture being discharged from ejector 50 and into the body of water W is greater than the fluid pressure (of water body W) in the vicinity of outlet port 56, loss of dissolved oxygen from the body of water W to the atmosphere is substantially less than heretofore attainable using conventional methods of oxygenating bodies of water. One such conventional method, for example, contemplates bubbling pressurized air or oxygen through the body of water, but does not otherwise contemplate retaining the bubbles in the body of water. Such conventional methods, moreover, typically employ aeration devices which cannot economically raise the dissolved oxygen content of water beyond e.g. about 80% saturation.

Figure 4:
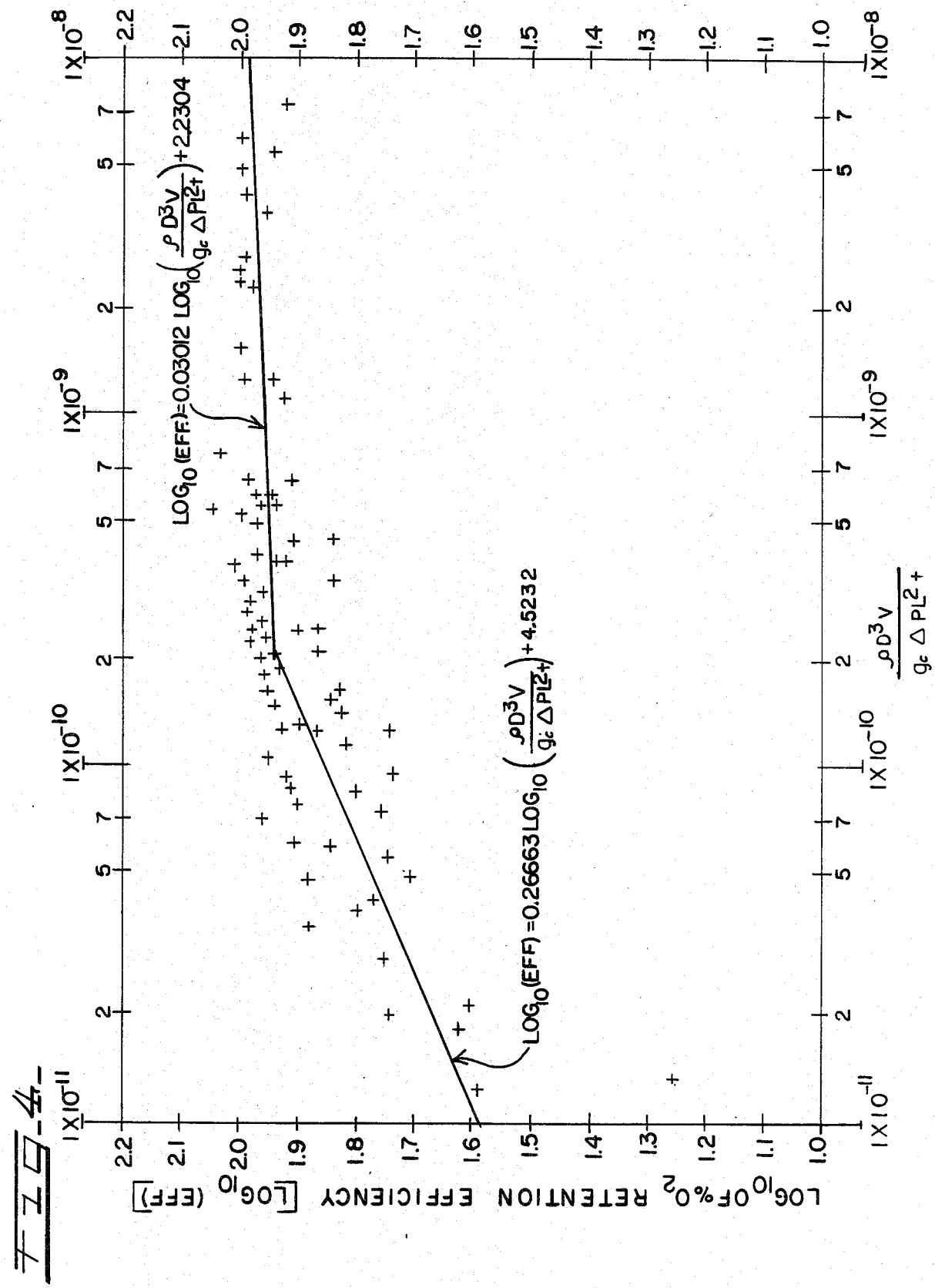
FIG. 4 is a plot illustrating the relationship between the relative dissolved-oxygen retention efficiency of an oxygen-enriched body of water and the dimensionless number defined hereinabove.

FIG. 4 is a plot showing the logarithm of relative dissolved-oxygen retention efficiency, versus three logarithmic cycles (i.e. orders of magnitude) of the above-mentioned dimensionless number values. Briefly, modulating a variety of parameters attendant to flow of the pressurized, oxygen-enriched aqueous liquid stream flowing through a confined flow passageway, so as to maintain the value of the dimensionless number, within the desired range, has had surprising benefits, particularly in connection with increasing the dissolved oxygen content of a body of water having a relatively low oxygen content. In particular, maintaining the value of the dimensionless number within a range of predetermined values has enabled the oxygen-enrichment of an oxygen-subsaturated body of water to take place in a manner such that substantially all of the dissolved oxygen present in a pressurized, oxygen-enriched, aqueous liquid stream is transferred to the oxygen-subsaturated body of water.

The oxygen-transfer efficiency of the present invention is accordingly optimized by maintaining the dimensionless number usually at a value in the range of about $1 \times 10^{-10}$ to about $5 \times 10^{-7}$, and more preferably in the range of about $5 \times 10^{-10}$ to about $1 \times 10^{-8}$.

An example, which applies the principles of the present invention to a fish hatchery raceway, is set forth immediately below.

EXAMPLE

A raceway in a fish hatchery was enriched in dissolved oxygen utilizing the principles of the present invention as follows. The raceway was located at a geographic elevation of about 4,000 feet above sea level. Water flow rate into the raceway ($F_1$) was about 20 gallons per minute (g.p.m.). The water temperature of the raceway was about 65 degrees Fahrenheit (about 18 degrees Centigrade). An average dissolved oxygen (D.0.) concentration in the raceway water prior to oxygen enrichment was about 6.96 milligrams per milliliter (mg/ml).

The water stream utilized for dissolved oxygen enrichment was saturated with oxygen at varying superatmospheric pressures in a pressurized, packed column, thereby producing an oxygen-enriched water mixture. This mixture was thereafter passed through a bubble disengagement zone within the column in a manner such that the oxygen-enriched water stream which passed to the raceway was substantially free from bubbles that would otherwise grow spontaneously in the raceway at the superatmospheric saturation pressure used.

Briefly, pressure drop across a pressurized, confined flow passageway, used to convey the oxygen-enriched water mixture from the packed column to the raceway, was recorded, as was ambient pressure and flow rate of the water mixture through the flow passageway ($F_2$). Mean transit time of the water mixture through the flow passageway was calculated; and dissolved oxygen (D.0.) concentration of the raceway water after oxygen enrichment was determined by analyzing the oxygen enriched water from time to time.

The oxygen-enriched water stream was introduced into the raceway, employing a conventional manifold arrangement spaced about fourteen inches below the raceway water surface.

A series of 87 tests were then performed oxygenating the raceway water in accordance with the above-mentioned Example. The results of these tests are summarized in Table I and presented in FIG. 4.

TABLE I

| Test No. | Bar. Press. mmHg | $P_1$, psig | $P_2$, psig | No. of Holes in Manifold | Raceway Oxygenation $F_2$, gpm | $O_2$ contribution to raceway by Feed, mg/ml | D.O. concen. in raceway after mix | Calculated Transient time, sec. | $\dfrac{\rho D^3 V}{g_c \Delta P L^2 t}$ | % Rel. Efficiency |
|---|---|---|---|---|---|---|---|---|---|---|
| 1 | 654.0 | 40 | 39 | 1 | 0.32 | 123.8 | 8.28 | 15.0 | 1.633E-9 | 92 |
| 2 | 652.9 | 40 | 30 | 1 | 0.28 | 91.7 | 8.13 | 17.2 | 4.497E-10 | 68 |
| 3 | 652.6 | 40 | 20 | 1 | 0.25 | 75.0 | 7.80 | 19.3 | 4.984E-11 | 56 |
| 4 | 652.1 | 40 | 10 | 1 | 0.30 | 53.4 | 7.42 | 24.1 | 2.126E-11 | 40 |
| 5 | 651.7 | 40 | 5 | 1 | 0.17 | 23.6 | 7.10 | 28.3 | 1.317E-11 | 18 |
| 6 | 652.8 | 40 | 6 | 2 | 0.30 | 78.7 | 8.02 | 16.1 | 4.221E-11 | 59 |
| 7 | 652.6 | 40 | 13 | 2 | 0.40 | 90.6 | 8.60 | 12.0 | 9.451E-11 | 68 |
| 8 | 651.7 | 40 | 26 | 2 | 0.47 | 116.7 | 9.48 | 10.2 | 1.468E-11 | 87 |
| 9 | 650.6 | 40 | 32 | 2 | 0.50 | 125.0 | 9.84 | 9.6 | 4.984E-10 | 93 |
| 10 | 653.4 | 40 | 39 | 2 | 0.53 | 127.4 | 10.07 | 9.1 | 4.480E-9 | 95 |
| 11 | 653.9 | 40 | 6 | 3 | 0.40 | 76.8 | 8.33 | 12.0 | 7.505E-11 | 57 |
| 12 | 652.8 | 40 | 10 | 3 | 0.50 | 107.8 | 9.42 | 9.6 | 1.329E-10 | 80 |
| 13 | 650.3 | 40 | 20 | 3 | 0.71 | 124.8 | 11.00 | 6.8 | 4.020E-10 | 93 |
| 14 | 651.1 | 40 | 29 | 3 | 0.80 | 128.4 | 11.63 | 6.0 | 2.759E-10 | 96 |
| 15 | 650.7 | 40 | 38 | 3 | 0.88 | 134.1 | 12.32 | 5.5 | 6.079E-9 | 100 |
| 16 | 648.8 | 60 | 10 | 3 | 0.52 | 104.4 | 9.43 | 93 | 8.625E-11 | 63 |
| 17 | 650.6 | 60 | 20 | 3 | 0.69 | 149.1 | 11.70 | 7.0 | 1.898E-10 | 90 |
| 18 | 649.7 | 60 | 30 | 3 | 0.80 | 163.7 | 12.99 | 6.0 | 3.402E-10 | 99 |
| 19 | 650.1 | 60 | 40 | 3 | 0.91 | 160.7 | 13.65 | 5.3 | 6.602E-10 | 97 |
| 20 | 650.5 | 60 | 50 | 3 | 0.99 | 164.3 | 14.38 | 4.7 | 1.563E-9 | 100 |
| 21 | 651.3 | 60 | 56 | 3 | 1.03 | 163.6 | 14.63 | 4.7 | 4.229E-9 | 97 |
| 22 | 650.4 | 60 | 10 | 2 | 0.35 | 91.3 | 8.41 | 16.7 | 3.907E-11 | 55 |
| 23 | 649.6 | 60 | 20 | 2 | 0.43 | 113.9 | 9.21 | 11.2 | 1.475E-10 | 69 |
| 24 | 649.0 | 60 | 30 | 2 | 0.49 | 140.4 | 10.15 | 9.8 | 1.276E-10 | 85 |
| 25 | 648.7 | 60 | 40 | 2 | 0.54 | 150.4 | 10.73 | 8.9 | 2.325E-10 | 91 |
| 26 | 648.5 | 60 | 50 | 2 | 0.58 | 162.7 | 11.35 | 8.3 | 5.365E-10 | 99 |
| 27 | 646.4 | 60 | 57.5 | 2 | 0.61 | 165.1 | 11.64 | 8.0 | 2.373E-9 | 100 |
| 28 | 646.7 | 60 | 10 | 1 | 0.24 | 69.4 | 7.70 | 20.1 | 1.837E-11 | 42 |
| 29 | 646.1 | 60 | 20 | 1 | 0.27 | 94.8 | 8.13 | 17.8 | 2.907E-11 | 57 |
| 30 | 648.1 | 60 | 30 | 1 | 0.30 | 127.4 | 8.74 | 16.1 | 4.784E-11 | 77 |
| 31 | 648.0 | 60 | 40 | 1 | 0.33 | 137.0 | 9.07 | 14.6 | 8.684E-11 | 83 |
| 32 | 647.8 | 60 | 50 | 1 | 0.36 | 146.1 | 9.42 | 13.6 | 2.067E-10 | 88 |
| 33 | 647.8 | 60 | 59 | 1 | 0.38 | 155.0 | 9.72 | 12.7 | 2.303E-9 | 94 |
| 34 | 654.5 | 20 | 5 | 1 | 0.18 | 57.4 | 7.41 | 26.8 | 3.445E-11 | 68 |
| 35 | 654.4 | 20 | 10 | 1 | 0.24 | 69.4 | 7.70 | 20.1 | 9.186E-11 | 83 |
| 36 | 654.8 | 20 | 15 | 1 | 0.27 | 79.8 | 7.93 | 17.8 | 2.325E-10 | 95 |
| 37 | 654.4 | 20 | 19.5 | 1 | 0.29 | 83.9 | 8.06 | 16.6 | 2.682E-9 | 100 |
| 38 | 654.0 | 20 | 5 | 2 | 0.26 | 77.9 | 7.87 | 18.5 | 7.188E-11 | 93 |
| 39 | 654.5 | 20 | 10 | 2 | 0.36 | 77.1 | 8.20 | 13.4 | 2.067E-10 | 92 |
| 40 | 654.9 | 20 | 15 | 2 | 0.42 | 76.5 | 8.39 | 11.5 | 5.626E-10 | 91 |
| 41 | 654.0 | 20 | 19 | 2 | 0.46 | 75.9 | 8.51 | 10.5 | 3.375E-9 | 90 |
| 42 | 652.4 | 20 | 5 | 3 | 0.40 | 65.1 | 8.10 | 12.0 | 1.702E-10 | 78 |
| 43 | 652.6 | 20 | 10 | 3 | 0.51 | 75.3 | 8.66 | 9.4 | 3.287E-10 | 90 |
| 44 | 648.2 | 20 | 15 | 3 | 0.62 | 83.1 | 9.25 | 7.8 | 1.226E-9 | 99 |
| 45 | 648.0 | 20 | 17.5 | 3 | 0.67 | 83.2 | 9.43 | 7.2 | 2.864E-9 | 99 |
| 46 | 650.5 | 40 | 30 | 1 | 0.28 | 98.9 | 8.23 | 3.45 | 2.448E-10 | 74 |
| 47 | 650.5 | 40 | 34 | 1 | 0.29 | 109.1 | 8.42 | 3.33 | 4.377E-10 | 81 |
| 48 | 650.1 | 40 | 36 | 1 | 0.29 | 115.4 | 8.51 | 3.33 | 6.565E-10 | 86 |
| 49 | 649.8 | 40 | 39.5 | 1 | 0.30 | 117.3 | 8.59 | 3.22 | 5.619E-9 | 87 |
| 50 | 649.0 | 40 | 30 | 2 | 0.45 | 109.7 | 9.22 | 2.15 | 6.322E-10 | 82 |
| 51 | 649.0 | 40 | 34 | 2 | 0.46 | 111.5 | 9.31 | 2.10 | 1.101E-9 | 83 |
| 52 | 649.8 | 40 | 39 | 2 | 0.49 | 113.2 | 9.50 | 1.97 | 7.496E-9 | 84 |
| 53 | 650.0 | 40 | 30 | 3 | 0.64 | 118.5 | 10.42 | 1.51 | 1.279E-9 | 88 |
| 54 | 650.0 | 40 | 34 | 3 | 0.67 | 129.1 | 10.92 | 1.44 | 2.336E-9 | 96 |
| 55 | 650.2 | 40 | 37 | 3 | 0.69 | 134.1 | 11.20 | 1.40 | 4.954E-9 | 100 |
| 56 | 643.0 | 40 | 20 | 3 | 0.28 | 72.2 | 7.86 | 3.45 | 9.790E-11 | 54 |
| 57 | 643.0 | 40 | 20 | 3 | 0.30 | 89.5 | 8.18 | 3.22 | 1.405E-10 | 67 |
| 58 | 643.2 | 40 | 25 | 3 | 0.32 | 99.0 | 8.41 | 3.02 | 2.131E-10 | 74 |
| 59 | 645.0 | 40 | 10 | 2 | 0.40 | 90.0 | 8.58 | 2.42 | 1.665E-10 | 67 |
| 60 | 645.4 | 40 | 15 | 2 | 0.46 | 104.4 | 9.15 | 2.10 | 2.642E-10 | 78 |
| 61 | 647.1 | 40 | 20 | 2 | 0.50 | 112.3 | 9.53 | 1.93 | 3.902E-10 | 84 |
| 62 | 647.0 | 40 | 25 | 2 | 0.53 | 117.4 | 9.81 | 1.82 | 5.847E-10 | 88 |
| 63 | 645.2 | 40 | 10 | 3 | 0.39 | 91.7 | 8.58 | 2.48 | 1.583E-10 | 68 |
| 64 | 643.0 | 40 | 15 | 3 | 0.44 | 105.9 | 9.09 | 2.20 | 2.418E-10 | 79 |
| 65 | 643.0 | 40 | 20 | 3 | 0.50 | 116.8 | 9.64 | 1.93 | 3.902E-10 | 87 |
| 66 | 643.0 | 40 | 25 | 3 | 0.54 | 124.1 | 10.04 | 1.79 | 6.069E-10 | 93 |
| 67 | 650.3 | 40 | 5 | 3 | 0.19 | 101.5 | 7.85 | 5.09 | 3.534E-11 | 76 |
| 68 | 650.3 | 40 | 5.5 | 2 | 0.36 | 89.0 | 8.41 | 2.68 | 1.173E-10 | 66 |
| 69 | 650.3 | 40 | 5 | 3 | 0.43 | 120.5 | 9.35 | 2.25 | 1.649E-10 | 90 |
| 70 | 650.3 | 60 | 5 | 3 | 0.19 | 92.0 | 7.76 | 5.09 | 2.049E-11 | 56 |
| 71 | 650.3 | 60 | 15 | 3 | 0.24 | 128.4 | 8.40 | 4.02 | 3.996E-11 | 79 |
| 72 | 650.1 | 60 | 20 | 3 | 0.28 | 133.8 | 8.71 | 3.45 | 6.119E-11 | 81 |
| 73 | 649.6 | 60 | 24 | 3 | 0.30 | 130.8 | 8.79 | 3.22 | 7.805E-11 | 80 |
| 74 | 648.7 | 60 | 30 | 3 | 0.32 | 146.7 | 9.16 | 3.02 | 1.061E-10 | 89 |
| 75 | 649.8 | 60 | 5 | 2 | 0.15 | 63.4 | 7.38 | 6.44 | 1.277E-11 | 39 |
| 76 | 650.6 | 60 | 10 | 2 | 0.30 | 92.2 | 8.22 | 3.22 | 5.619E-11 | 56 |
| 77 | 651.3 | 60 | 15 | 2 | 0.36 | 114.4 | 8.86 | 2.68 | 8.991E-11 | 70 |

TABLE I-continued

| | | | | | Raceway Oxygenation | | | | |
|---|---|---|---|---|---|---|---|---|---|
| Test No. | Bar. Press. mmHg | $P_1$, psig | $P_2$, psig | No. of Holes in Manifold | $F_2$, gpm | $O_2$ contribution to raceway by Feed, mg/ml | D.O. concen. in raceway after mix | Calculated Transient time, sec. | $\dfrac{\rho D^3 V}{g_c \Delta P L^2 t}$ | % Rel. Efficiency |
| 78 | 650.5 | 60 | 20 | 2 | 0.41 | 121.5 | 9.26 | 2.36 | 1.280E-10 | 74 |
| 79 | 650.5 | 60 | 25 | 2 | 0.47 | 141.5 | 10.05 | 2.06 | 1.970E-10 | 86 |
| 80 | 650.3 | 60 | 30 | 2 | 0.50 | 151.7 | 10.49 | 1.93 | 2.601E-10 | 92 |
| 81 | 653.3 | 60 | 9 | 3 | 0.31 | 115.7 | 8.62 | 3.22 | 5.869E-11 | 70 |
| 82 | 653.8 | 60 | 15 | 3 | 0.42 | 120.1 | 9.30 | 2.30 | 1.239E-10 | 74 |
| 83 | 653.6 | 60 | 20 | 3 | 0.50 | 143.1 | 10.28 | 1.93 | 1.951E-10 | 87 |
| 84 | 653.3 | 60 | 24 | 3 | 0.54 | 158.0 | 10.93 | 1.79 | 2.529E-10 | 96 |
| 85 | 653.1 | 60 | 30 | 3 | 0.61 | 169.5 | 11.77 | 1.58 | 3.871E-10 | 103 |
| 86 | 653.0 | 60 | 35 | 3 | 0.66 | 183.8 | 12.61 | 1.46 | 5.438E-10 | 112 |
| 87 | 652.9 | 60 | 40 | 3 | 0.71 | 178.5 | 12.84 | 1.36 | 7.892E-10 | 109 |

Briefly, FIG. 4 is a plot, illustrating the relative dissolved-oxygen retention efficiency of an oxygen-enriched aqueous liquid stream or body of water, wherein the dissolved oxygen content of the body of water is increased in dissolved oxygen content, employing the principles of the present invention. The logarithm of relative efficiency values is read from the vertical axis. The horizontal axis presents three orders or magnitude (i.e., each logarithmically graduated) of the dimensionless number mentioned above.

What has been illustrated and described herein is a novel method and system for enriching the dissolved oxygen content of a body of water having a relatively low oxygen content. While the method and system of the present invention have been illustrated and described with reference to a preferred embodiment (i.e. optimizing fish hatchery conditions), the present invention is not limited thereto. For example, the method disclosed herein can be used to maintain dissolved oxygen content of an aquaculture system, to hyperbarically sterilize aqueous media, to oxygenate biological reactors, to oxidatively leach ore, and to remove iron and manganese ions from potable water. The present invention thus contemplates that, oxygenated water can be introduced into a biofiltration system to promote biological oxidation of ammonia and to convert nitrite ion to nitrate ion. The present invention also contemplates that oxygenated water can be introduced into a fermentor to promote biological oxidation of organic compounds, e.g. such water can be introduced into a sewage digester to promote the aerobic digestion of sewage. Accordingly, functional equivalents of the steps of the method, and/or mechanical equivalents of system elements or components, and other alternatives, changes or modifications of the method and system of the present invention, may become apparent to those skilled in the art upon reading the foregoing description. Moreover, such alternatives, equivalents, changes and modifications are to be considered as forming a part of the invention insofar as they fall within the spirit and scope of the appended claims.

I claim:

1. A method for enriching the oxygen content of the body of water having a relatively low oxygen content which comprises the steps of:

providing, in a confined flow passageway communicating with said body of water, a flowing aqueous liquid stream under pressure, supersaturated with respect to dissolved oxygen concentration thereof, and substantially free from growing bubbles, thereby producing a pressurized, flowing, oxygen-enriched aqueous liquid stream;

modulating the flow rate of said pressurized, flowing, oxygen-enriched aqueous liquid stream in a manner so as to maintain a dimensionless number defined as:

$$\frac{\rho D^3 V}{g_c \Delta P L^2 t}$$

wherein $\rho$ = liquid density of the aqueous liquid stream under pressure in the confined flow passageway, $D$ = internal diameter of the confined flow passageway, $V$ = mean liquid velocity of the aqueous liquid stream in the confined flow passageway, $g_c$ = gravitational constant, $\Delta P$ = pressure drop of the aqueous liquid stream across the confined flow passageway, $L$ = length of the confined flow passageway, and $t$ = mean transit time required by the aqueous liquid stream to flow through the confined flow passageway, at a value in the range of about $1 \times 10^{-10}$ to about $5 \times 10^{-7}$; and commingling the pressurized, flowing, oxygen-enriched aqueous liquid stream with the body of water so as to effect oxygen enrichment of the body of water without substantial loss of oxygen from the oxygen-enriched body of water to the ambient atmosphere.

2. The method according to claim 1 wherein the value of the dimensionless number is in the range of about $5 \times 10^{-10}$ to about $1 \times 10^{-8}$.

3. A method for enriching the oxygen content of a body of water having a relatively low oxygen content which comprises the steps of:

treating a stream of water to increase the weight ratio of dissolved oxygen therein by contacting the water stream with an oxygen-enriched gas stream at a superatmospheric pressure to produce a two-phase fluid characterized by an aqueous continuous phase in a gaseous discontinuous phase;

recovering from the two-phase fluid an aqueous liquid stream which is enriched with respect to dissolved oxygen concentration thereof and which is substantially free of growing bubbles, thereby producing a pressurized, flowing, oxygen-enriched, recovered aqueous liquid stream, while the two-phase fluid is maintained under an oxygen partial pressure greater than ambient oxygen partial pressure;

confining the recovered aqueous liquid stream to a confined flow passageway;

modulating the flow rate of the confined, recovered aqueous liquid stream in a manner so as to maintain a dimensionless number defined as:

$$\frac{\rho D^3 V}{g_c \Delta P L^2 t}$$

wherein
- $\rho$ = liquid density of the confined, recovered aqueous liquid stream flowing in the confined flow passageway,
- D = internal diameter of the confined flow passageway,
- V = mean liquid velocity of the recovered aqueous liquid stream in the confined flow passageway,
- $g_c$ = gravitational constant,
- $\Delta P$ = pressure drop of the recovered aqueous liquid stream across the confined flow passageway,
- L = length of the confined flow passageway, and
- t = mean transit time required by the recovered aqueous liquid stream to flow through the confined flow passageway, at a value in the range of about $1 \times 10^{-10}$ to about $5 \times 10^{-7}$; and commingling the confined, recovered aqueous liquid stream with the body of water in a manner so as to effect oxygen enrichment of the body of water without substantial loss of oxygen from the oxygen-enriched body of water to the ambient atmosphere.

4. The method according to claim 3 wherein the value of the dimensionless number is in the range of about $5 \times 10^{-10}$ to about $1 \times 10^{-8}$.

5. The method of claim 3 wherein, in the treating step, the stream of water is treated in a generally closed, vented, continuous-flow contactor device having a countercurrent-flow portion, and wherein the water stream and the oxygen-enriched gas stream together contact in the countercurrent-flow portion of the contactor device and flow countercurrently therethrough relative to each other.

6. A system for enriching the oxygen content of a body of water having a relatively low oxygen content, comprising:

a generally closed, vented, continuous-flow contactor device having a countercurrent-flow portion;

a confined flow passageway operatively connected to the contactor device, and providing closed fluid communication between the contactor device and the body of water;

inlet means for introducing an aqueous liquid stream and an oxygen-enriched gaseous stream at superatmospheric pressure into the countercurrent-flow portion of the continuous-flow contactor device to provide an aqueous liquid stream subjected to superatmospheric pressure and supersaturated with respect to dissolved oxygen concentration thereof, and substantially free from growing bubbles, thereby producing a pressurized, flowing, oxygen-enriched aqueous liquid stream;

means for modulating the flow rate of said pressurized, flowing, oxygen-enriched aqueous liquid stream in a manner so as to maintain a dimensionless number, defined as:

$$\frac{\rho D^3 V}{g_c \Delta P L^2 t}$$

wherein
- $\rho$ = liquid density of the pressurized, supersaturated, aqueous liquid stream flowing through the confined flow passageway,
- D = internal diameter of the confined flow passageway,
- V = mean liquid velocity of the pressurized, supersaturated, aqueous liquid stream in the confined flow passageway,
- $g_c$ = gravitational constant,
- $\Delta P$ = pressure drop of the pressurized, supersaturated, aqueous liquid stream across the confined flow passageway,
- L = length of confined flow passageway, and
- t = mean transit time required by the pressurized, supersaturated, aqueous liquid stream to flow through the confined flow passageway, at a value in the range of about $1 \times 10^{-10}$ to about $5 \times 10^{-7}$; and commingler means for commingling, at the distal end of the confined flow passageway in relation to the contactor device, the pressurized, oxygen-enriched aqueous liquid stream with the body of water in a manner so as to effect oxygen enrichment of the body of water without substantial loss of oxygen from the oxygen-enriched body of water to the ambient atmosphere.

7. The system according to claim 6 wherein the value of the dimensionless number is in the range of about $5 \times 10^{-10}$ to about $1 \times 10^{-8}$.

8. The system of claim 6 wherein the continuous-flow contactor device comprises:

a pressurizable, vertically-elongated, upstanding surge tank means defining a vertically-disposed gas bubble disengagement zone, the surge tank means being adapted to enable the pressurized, oxygen-enriched aqueous liquid stream contained therein to continuously flow downwardly therethrough; and a pressurizable, packed column means mounted atop the surge tank means and communicating therewith, for receiving the aqueous liquid stream and the oxygen-enriched gaseous stream and for providing direct contact therebetween in a countercurrent-flow relationship, thereby producing the pressurized, oxygen-enriched aqueous liquid stream, wherein the gas bubble disengagement zone is dimensioned so as to enable growing gas bubbles that are contained within the oxygen-enriched aqueous liquid stream which is flowing downwardly through the surge tank means to disengage from the aqueous liquid stream before exiting the surge tank means.

9. The system of claim 6 wherein the commingler means comprises a liquid-liquid ejector.

* * * * *